Dec. 22, 1942.   J. E. VOKATY   2,305,750
LICENSE PLATE AND MOUNTING THEREFOR
Filed Sept. 12, 1938   2 Sheets-Sheet 1
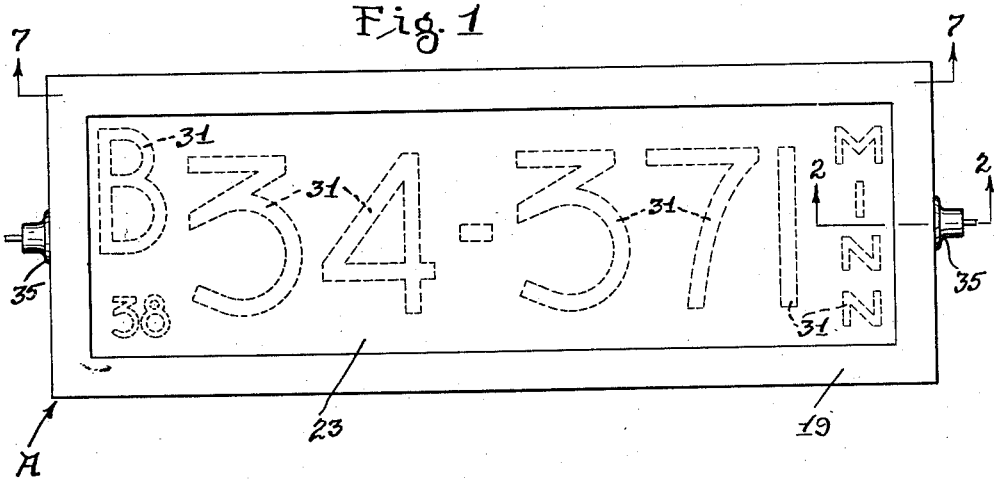
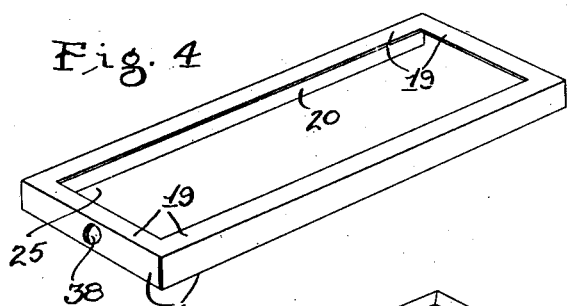
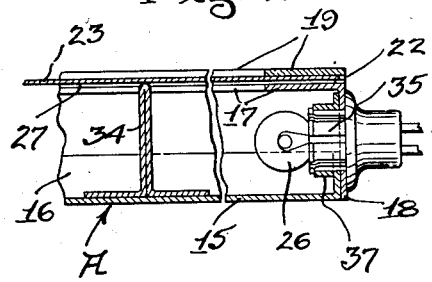
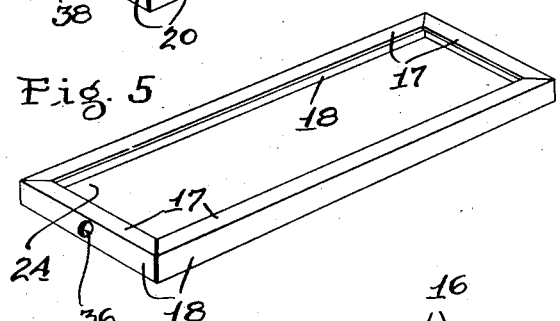
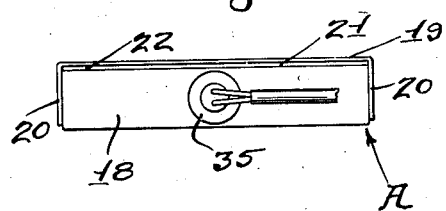
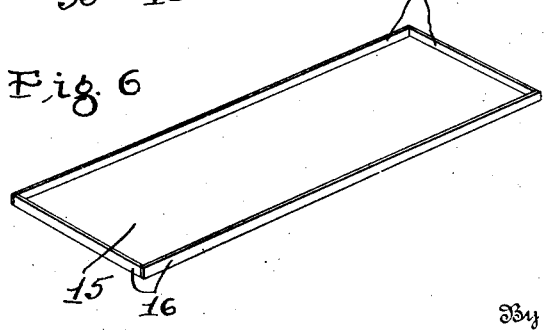
Inventor
Joseph E. Vokaty
By Caswell + Lagaard
Attorneys Dec. 22, 1942. J. E. VOKATY 2,305,750
LICENSE PLATE AND MOUNTING THEREFOR
Filed Sept. 12, 1938  2 Sheets-Sheet 2

Inventor
Joseph E. Vokaty
By Cauwell + Lagaard
Attorneys

Patented Dec. 22, 1942

2,305,750

UNITED STATES PATENT OFFICE 2,305,750

LICENSE PLATE AND MOUNTING THEREFOR

Joseph E. Vokaty, Minneapolis, Minn., assignor of one-half to Herbert H. Hoar, Glencoe, Minn.

Application September 12, 1938, Serial No. 229,541

9 Claims. (Cl. 40—133)

This invention relates to a plate and a mounting therefor and has more especial reference to an automotive vehicle license plate and a mounting structure for retaining such license plate.

An object of the invention is to provide a novel and improved mounting structure for a plate, such, for example, as a vehicle license plate, adapted to permanently to retain the plate in unique manner.

A further object of the present invention is to provide a mounting structure and a plate structure adapted to be associated or assembled together by causing a plurality of resilient ratchet elements or locking members of one of said structures to be slid over a plurality of ratchet elements or locking members of the other of said structures in such manner that ratchet elements or locking members of said structures will interlockingly engage each other and the mounting structure will permanently retain the plate structure against possibility of its removal by reversal of operations carried out to assemble or associate said structures with each other.

A further object of the invention is to provide a construction of the present nature, wherein a plate structure of relatively non-flexible material is adapted to be permanently associated with a mounting structure therefor, and, wherein said plate structure will be assembled with the mounting structure by the bending or flexing of resilient elements on said mounting structure and will be retained in or upon said mounting structure by the flexible elements thereof.

Another object of the invention is to provide a novel an improved vehicle license plate structure.

And a further object of the invention is to provide an assembly comprising an automotive vehicle licence plate of frangible material and mounting structure for the plate, wherein the whole is designed so that said plate can be disassociated from said mounting structure only upon the fracturing and fragmentizing of the license plate.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the of the invention and the scope of the claims which follow.

In the accompanying drawings forming a part of this specification,

Fig. 1 is a front elevational view of an automotive vehicle license plate and a mounting structure with which said plate is associated;

Fig. 2 is a detail sectional view taken on line 2—2 in Fig. 1;

Fig. 3 is an end elevation view of the mounting structure as seen from the right in Fig. 1;

Figs. 4, 5 and 6 are perspective views of parts of the mounting structure disassembled;

Figure 7:
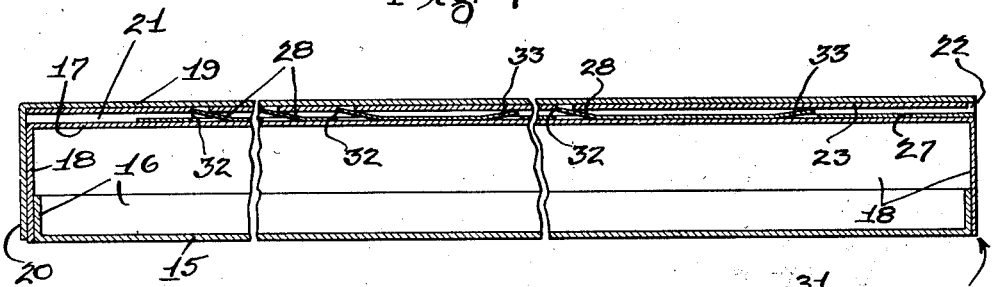
Fig. 7 is a longitudinal sectional view in detail taken on line 7—7 in Fig. 1.
Figure 8:
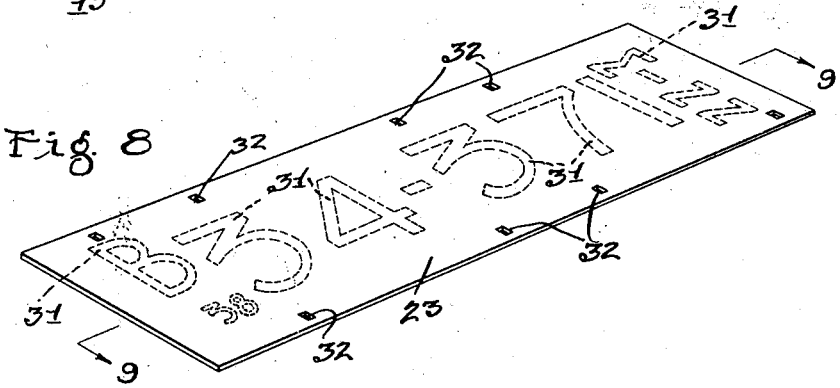
Fig. 8 is a perspective view of the vehicle license plate structure.
Figure 9:
Fig. 9 is a diagrammatical sectional view of the license plate structure taken on line 9—9 in Fig. 8.
Figure 10:
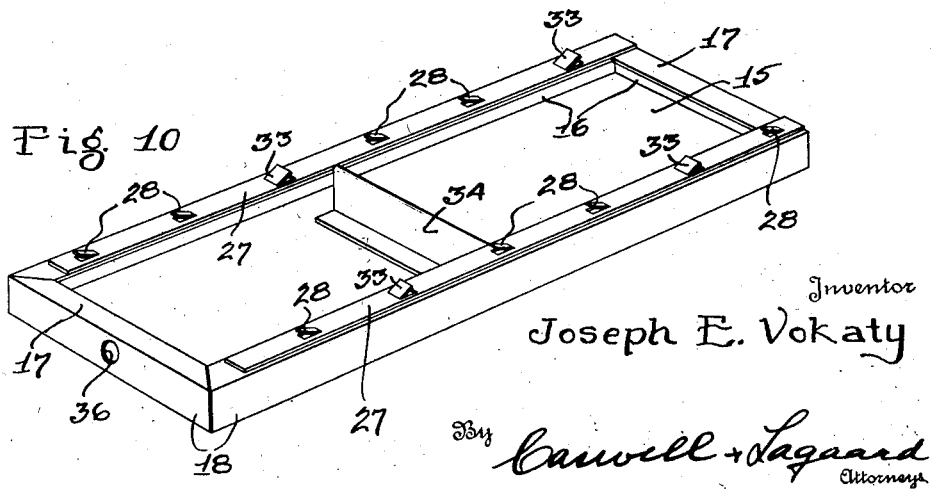
Fig. 10 is a perspective view of the mounting structure with its cover member removed.

The mounting structure, designated in its entirety by the reference letter A, is of general rectilinear conformation. It includes a back member 15 with a complete marginal flange 16, a frame member 17 with a complete marginal flange 18 fitted over and suitably secured, as by spot welding or otherwise, to the marginal flange 16 of the back member 15, and a cover member 19 with a marginal flange 20 fitted over and suitably secured, as by spot welding or otherwise, to the marginal flange 18 of the frame member 17. The cover member 19 is parallel with and slightly spaced from the frame member 17 and the marginal flange 20 of said cover member 19 extends along the marginal flange 18 of the frame member 17 at both sides and one end of said marginal flange 18, said cover member 19 having no flange portion at its other end. Rather, the frame member 17 and the cover member 19, with portions of the marginal flange 20 between said frame member and said cover member, provide a rectilinear channel or way 21 of relatively narrow depth and comparatively greater width defined by the lower surface of the cover member 19, the upper surface of the frame member 17 and the inner surfaces of the marginal flange 20 at the sides and one end of the mounting structure A, the end 22 of the channel or way 21 being open.

The width of the channel or way 21 in the mounting structure A is substantially equal to, or a trifle greater than the width of a plate, a vehicle license plate structure 23, preferably translucent, to be inserted into said channel or way 21 through its open end 22.

The back member 15 is solid, while the frame member 17 has a central cut-out 24 therein. The cover member 19 has a central rectangular cut-out 25, which registers with said cut-out 24 in said frame member 17. The plate structure, or license plate 23, when in place in the channel or space 21, is visible through the cut-out 25. Said cut-out 24 permits the passage of light through the license plate, and lamps 26 within the box-like mounting structure, provided by the back member 15 and the frame member 17, will, when lighted, render the license plate 23 more readily visible.

Suitably secured to each side rail of the frame member 17, as by spot welding or otherwise, is a locking strip 27 which carries a number of obliquely disposed resilient ratchet elements or locking members 28. As shown, each ratchet element or locking member 28 consists of a tongue-like portion struck from its respective strip 27, each such portion extending obliquely in the direction of the closed end of the channel or space 21 and being of such length that, unrestrained, it will bear resiliently at its extremity against the inner face of the cover member 19.

The plate structure, or vehicle license plate 23, desirably consists of a plurality of layers 30 of any suitable thin material, such as paper stock bonded together face to face with a resinous material under heat and pressure, and constituting a translucent and relatively non-flexible self-sustaining sheet that is frangible and readily broken into fragments upon being struck or distorted. Indicia 31 are incorporated in the license plate 23 between layers 30 thereof during fabrication of the plate structure and may consist of printing applied to one of the layers 30. Each individual layer 30 of the plate structure 23 will be relatively transparent and the layer or layers between the indicia 31 and the front face of said plate will be sufficiently transparent to render said indicia clearly visible to an observer of said face of said plate.

Each marginal portion of the license plate structure 23 is provided with ratchet elements or locking members 32 for cooperation with the ratchet elements or locking members 28 upon the locking strip 27 at the corresponding side of the mounting structure A. As disclosed, said ratchet elements or locking members 32 are provided by forming in said license plate structure, through the layers thereof, rectangular holes or slots, although each such ratchet elements or locking members could consist of recesses in or raised portions upon the rear or inner side of the license plate structure. The rectangular holes or slots formed in the license plate structure at either marginal portion thereof correspond in number and in relative disposition to the number and relative disposition of the ratchet elements or locking members 28 upon the locking strip 27 at the corresponding side of the mounting structure and, as shown, the holes or slots in the plate 23 freely receive the extremities of the resilient tongue-like elements or locking members 28 upon the locking strips 27.

The license plate 23 is slidable into the open end 22 of the channel or way 21 in the mounting structure A, said plate being adapted to be advanced over the resilient ratchet elements or locking members 28 and to be passed between them and the inner surface of the cover member 19, said elements or members 28, in such case, being depressed as the plate 23 is advanced or moved along. When the leading edge of the license plate structure 23 has reached the closed end of the channel or way 21, the extremities of the resilient tongue-like ratchet elements or locking members 28 are received in their respective openings or slots in the plate 23 and engage back of the shoulders formed by the leading walls of said openings or slots. Thus, the engagement of ratchet elements or members 32 upon the plate structure 23 with the ratchet elements or members 28 upon the locking strips 27 of the mounting structure preclude any possibility of removal of the plate 23, intact, from the mounting structure A. In addition to locking the plate 23 in its assembled relation within the mounting structure A, the tongue-like ratchet elements or locking members 28 operate yieldingly to hold said plate 23 against the inner face of the cover member 19.

Assisting in holding the plate 23 against the cover member 19 are a number of resilient guard tongues 33 which are struck up from the locking strips 27 into oblique positions, the sloping of such tongues 33 being in opposition to that of the tongue-like ratchet elements or locking members 28 and in a direction toward the open end 22 of the channel or space 21. The extremities of said guard tongues 33 yieldingly bear against the inner face of the license plate structure 23 and effectively augment the action of said ratchet elements or locking members 28 in holding the plate 23 against the cover member 19. These guard tongues 33 are greater in width than the length of the holes or slots which provide the ratcheting elements or locking members 32 on the plate 23, whereby it is only necessary to depress said tongues 33 ahead of the leading edge of the plate 23 when said plate is being advanced into its assembled relationship in the mounting structure A. Such depression of the tongues 33 is readily accomplished at such time by means of a screw driver or other simple tool which can be readily applied to said tongues 33 as the plate 23 is advanced. In this connection, it is to be noted that the tongues 33 upon the one locking strip 27 are staggered relative to the tongues 33 upon the other locking strip 27, such staggered relation of the tongues 33 causing the leading edge of the plate 23 to encounter but one of said tongues 33 at a time. The principal function of the guard tongues 33 is to prevent the depression of the tongue-like ratchet elements or locking members 28 after the license plate structure 23 is assembled with the mounting structure therefor. Said guard tongues 33, sloping toward the open end of the mounting structure, prevent the insertion of thin strips or other instruments into said end of said structure and between the locking strips 27 and plate 23 for the purpose of depressing and releasing said ratchet elements or locking members 28 from the ratchet elements or locking members 32 of the license plate structure. This function of said guard tongues 33 is important, since the desideratum is that the plate 23, once assembled with the mounting structure, shall not be disassembled therefrom short of the complete fragmentation and consequent destruction of said plate.

A reinforcing flange 34 is suitably secured to the inside of the back member 15, transversely thereof, substantially at its mid-length. This flange 34 not only reinforces the mounting structure, but it is of such height that it supports the license plate 23 from its inner side, transversely thereof, between its ends. Said flange 34 also serves as a partition in the assembled box-like structure and divides the same into light compartments, one of the lamps 26 being provided for each compartment. Said lamps 26 may be applied to the mounting structure A in any suitable manner, the familiar type of lamp with snap socket 35 being indicated in the drawings. The sockets 35 are adapted to be inserted into the mounting structure through end openings 36 in the flange 18 of the frame member 17 and snapped into place in socket receiving ferrules 37 secured to said flange 18. The flange 20 at the closed end of the cover member 19 is formed with an opening 38 which registers with the corresponding end opening 36 in the flange 18 of said frame member 17, said opening 38 serving to admit a lamp 26 and socket 35 to said opening 36.

The mounting structure A can be permanently secured upon a vehicle frame or other support in any convenient manner which will situate the open end 22 of the channel or space 21 in position to receive the plate structure.

Although the present invention may have different uses, it is, as above indicated, particularly adapted to use for the identification of motor vehicles. The plate 23 will be relatively light in weight permitting of ready and relatively inexpensive transportation in the mails from the issuing source to the authorized user. The user's mounting structure will be readily permanently secured to his vehicle and the license plate will be readily applied to mounting structure, simply by inserting the plate structure thereinto. The indicia incorporated between laminations of the translucent plate will be readily visible by day and by night and especially so at night by reason of the illumination provided within the mounting structure. Such indicia will be protected against alteration and will also be protected against being rendered illegible by the action of climatic conditions. The license plate, though frangible and subject to being fragmentized with intent so to do, will be relatively durable and remain intact under all ordinary conditions. When said plate has served its purpose, it will be readily broken and removed in fragments from the mounting structure to permit the substitution therefor of a then currently suitable plate. The license plate, once assembled in its mounting structure, will not be available for assembly with any other mounting structure and, therefore, cannot be used to identify any vehicle other than the one to which it may be originally applied.

Having described my invention, what I claim as new and desire to protect by Letters Patent is:

1. A plate and a mounting structure therefor providing a channel closed at one end and open at the other end for the edgewise reception of the plate, said channel including relatively spaced walls sheathing the marginal side portions of the plate, one such portion of said plate having slots therein, resilient tongue-like locking elements mounted upon one of said walls and sloping in the direction of the closed end of said channel, said elements being adapted interlockingly to engage in the slots in the plate and preclude the retraction of said plate from said channel, resilient guard tongues mounted on said last mentioned wall and sloping in the direction of said open end of said channel to protect said locking elements against dislodgement from said slots in said plate, said guard tongues engaging said plate and yieldingly holding it against the opposing channel wall, said plate being of frangible material and adapted to be broken into fragments for removal from the mounting structure.

2. A plate and a mounting structure therefor providing a channel closed at one end and open at the other end for the edgewise reception of the plate, said channel including relatively spaced walls sheathing the marginal side portions of the plate, such portions of said plate having slots therein, resilient tongue-like locking elements mounted upon one of said walls and sloping in the direction of the closed end of said channel, said elements being adapted interlockingly to engage in the slots in the plate and preclude the retraction of said plate from said channel, resilient guard tongues mounted on said last mentioned wall and sloping in the direction of said open end of said channel to protect the locking elements against dislodgement from the slots in the plate, said locking elements and guard-tongues bearing against said plate and yieldingly holding it against the opposing channel wall.

3. A plate and a mounting structure therefor providing a channel closed at one end and open at the other end for the edgewise reception of the plate, said channel including relatively spaced walls sheathing the marginal side portions of the plate, one such portion of said plate having slots therein, resilient tongue-like locking elements mounted upon one of said walls and sloping in the direction of the closed end of said channel, said elements being adapted interlockingly to engage in the slots in the plate and preclude the retraction of said plate from said channel, resilient guard tongues mounted on said last mentioned wall and sloping in the direction of said open end of said channel to protect the locking elements against dislodgement from the slots in the plate, said guard tongues being non-registerable with said slots, said plate being frangible and required to be broken into fragments for removal from the mounting structure.

4. A plate, a mounting structure providing a channel closed at one end and open at the other end for the edgewise reception of the plate, said channel including relatively spaced walls sheathing the marginal side portions of the plate, such portions of said plate having slots therein, resilient tongue-like locking elements at both sides of the channel mounted upon one of said walls and sloping in the direction of the closed end of said channel, said elements being adapted interlockingly to engage in the slots in the plate and preclude the retraction of said plate from said channel, resilient guard tongues at both sides of the channel mounted on said last mentioned wall and sloping in the direction of said open end of said channel to protect the locking elements against dislodgement from the slots in the plate, said guard tongues at the opposite sides of said channel being relatively staggered longitudinally of said channel and non-registerable with said slots in said plate, said plate being of frangible material and adapted to be broken into fragments for removal from the mounting structure.

5. A plate of translucent material carrying indicia upon the body thereof, a box-like mounting structure for the plate, said structure being open at one side thereof and providing at such side a channel open at one end for the edgewise reception of said plate, said channel including relatively spaced inner and outer walls sheathing the marginal side portions of the plate but unobstructing the body thereof, each of such portions of the plate having therein a succession of slots distributed therealong, resilient locking elements mounted upon said inner wall, said elements being adapted interlockingly to engage in the slots in the plate and preclude the retraction of said plate from said channel, a lamp within the mounting structure for illuminating the plate, guard means for preventing access to said locking elements from said open end of said channel, said guard means including a partitioning member in said box-like mounting structure, such member serving to reinforce the mounting structure and also the plate, said plate being frangible and adapted to be broken into fragments for removal from the mounting structure, the breaking of the plate at the localities of the locking elements for the disengagement of said plate from said elements and the breaking of the plate at the body thereof for destruction of the indicia thereon being facilitated by the slots in the marginal side portions of said plate.

6. A plate having indicia borne thereby and visibly displayed at the front face of the body of said plate, a mounting structure providing a channel for the edgewise reception of the plate, said channel including relatively spaced front and rear walls sheathing the marginal side portions of the plate but unobstructing said face of the body of the plate, one of said marginal side portions having at the rear of the plate a succession of ratcheting recesses, the same being distributed along substantially the entire length of said marginal side portion, resilient ratcheting elements mounted upon said rear wall and adapted interlockingly to engage in the recesses in the plate and preclude the retraction of said plate from said channel, said plate being frangible and not only adapted but required to be broken into fragments for removal from the mounting structure, the breaking of the plate at the localities of the resilient ratcheting elements to permit the disengagement of the plate from said elements and at the body of the plate for destruction of the indicia thereon being facilitated by said recesses in said marginal side portion of said plate.

7. A plate having indicia borne thereby and visibly displayed at the front face of the body of said plate, a mounting structure providing a channel for the edgewise reception of the plate, said channel including relatively spaced front and rear walls sheathing the marginal side portions of the plate, but unobstructing said face of the body of said plate, each of said marginal side portions of the plate having therein a succession of slots distributed along substantially the entire length thereof, resilient ratcheting tongues mounted upon said rear wall and adapted interlockingly to engage in the slots in the plate and preclude the retraction of said plate from said channel, said plate being frangible and not only adapted but required to be broken into fragments for removal from the mounting structure, the breaking of the plate at the localities of the ratcheting tongues to permit the disengagement of said plate from said tongues and at the body of the plate for destruction of the indicia thereon being facilitated by said slots in said marginal side portions of said plate.

8. A plate having indicia thereon, a mounting structure providing a channel for the edgewise reception of the plate, said channel including relatively spaced front and rear walls sheathing the opposed marginal side portions of the plate but unobstructing said face of said body of the plate, each of said marginal side portions of the plate having therein a succession of slots distributed along substantially the entire length thereof, the slots in said opposed marginal side portions being relatively staggered lengthwise of the plate, resilient ratcheting tongues mounted upon said rear wall and adapted interlockingly to engage in the slots in the plate and preclude the retraction of said plate from said channel, said plate being frangible and not only adapted but required to be broken into fragments for removal from the mounting structure, the breaking of the plate at the localities of the ratcheting tongues to permit the disengagement of the plate from said tongues and at the body of the plate for destruction of the indicia thereon being facilitated by said slots in said marginal side portions of said plate.

9. A plate of translucent material carrying indicia upon the body thereof, a box-like mounting structure for the plate, said structure being open at one side thereof and providing at such side a channel closed at one end and open at the other end for the edgewise reception of said plate, said channel including relatively spaced walls sheathing the opposed marginal side portions of the plate, but unobstructing the body thereof, each of such portions of the plate having therein a succession of slots distributed along substantially the entire length thereof, the slots in said opposed marginal side portions being relatively staggered lengthwise of the plate, resilient tongue-like locking elements mounted upon one of said walls and sloping in the direction of the closed end of said channel, said elements being adapted interlockingly to engage in the slots in the plate and preclude the retraction of said plate from said channel, a lamp within the mounting structure for illuminating the plate, said plate being frangible and adapted to be broken into fragments for removal from the mounting structure, the breaking of the plate at the localities of the locking elements for disengagement of said plate from said elements and the breaking of the plate at the body thereof for destruction of the indicia thereon being facilitated by the slots in the marginal side portions of said plate.

JOSEPH E. VOKATY.